United States Patent [19]

Kanazawa et al.

[11] Patent Number: 4,811,151
[45] Date of Patent: Mar. 7, 1989

[54] SHUTTER ASSEMBLED DISC CARTRIDGE

[75] Inventors: Yasunori Kanazawa, Hachioji; Yoshiyuki Nakamori; Tadahiro Kuwa, both of Ibaragi; Nobuyuki Fujimoto, Odawara; Shinichi Abe, Kanagawa, all of Japan

[73] Assignees: Hitachi Maxell, Ltd., Osaka; Hitachi, Ltd., Tokyo, both of Japan

[21] Appl. No.: 13,051

[22] Filed: Feb. 10, 1987

Related U.S. Application Data

[63] Continuation of Ser. No. 642,508, Aug. 20, 1984.

[30] Foreign Application Priority Data

Aug. 20, 1983 [JP] Japan .................................. 58-150963
Aug. 27, 1983 [JP] Japan .................................. 58-155723

[51] Int. Cl.$^4$ ...................... G11B 23/02; G11B 05/012
[52] U.S. Cl. .................................... 360/133; 360/99.06
[58] Field of Search ...................... 360/86, 97, 99, 133, 360/135; 369/291; 346/137; 206/312, 444

[56] References Cited

U.S. PATENT DOCUMENTS 4,622,607 11/1986 Smith .................................... 360/97

FOREIGN PATENT DOCUMENTS 58-50676 3/1983 Japan .................................... 360/97

Primary Examiner—John H. Wolff
Attorney, Agent, or Firm—Birch, Stewart, Kalasch & Birch

[57] ABSTRACT

A recording disc cartridge comprising a disc case formed by a top half and a bottom half each having a spindle hole and a head insertion hole, a recording medium rotatably enclosed in the disc case, shutter means for closing and opening the spindle holes and the head insertion holes, a slide means for moving the shutter means in both lateral directions relative to a line which passes through each center of the spindle hole and the head insertion hole and means for resiliently exerting the slide means so as to drive the shutter means for closing the spindle holes and the head insertion holes.

27 Claims, 10 Drawing Sheets

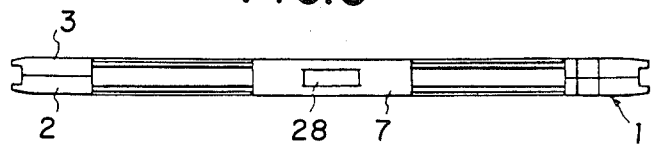
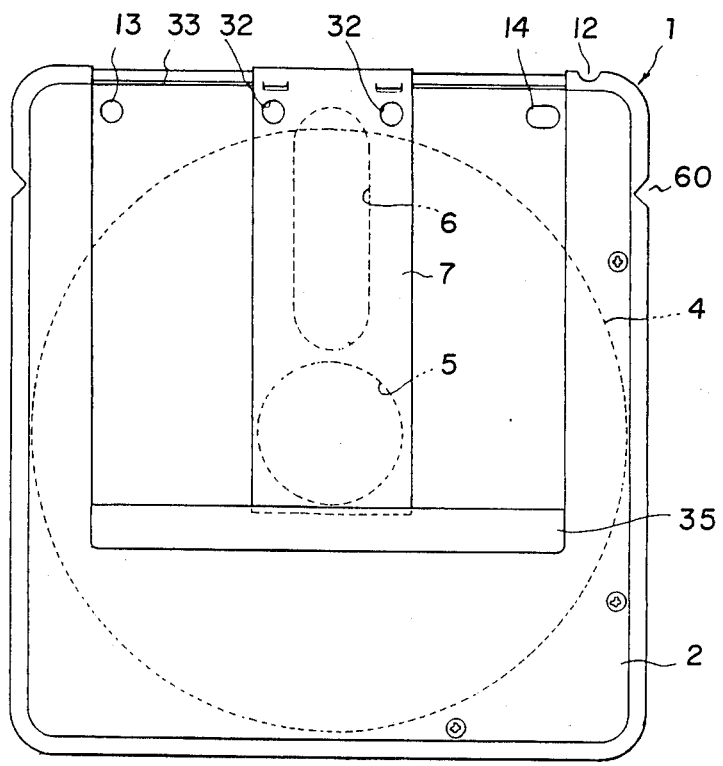

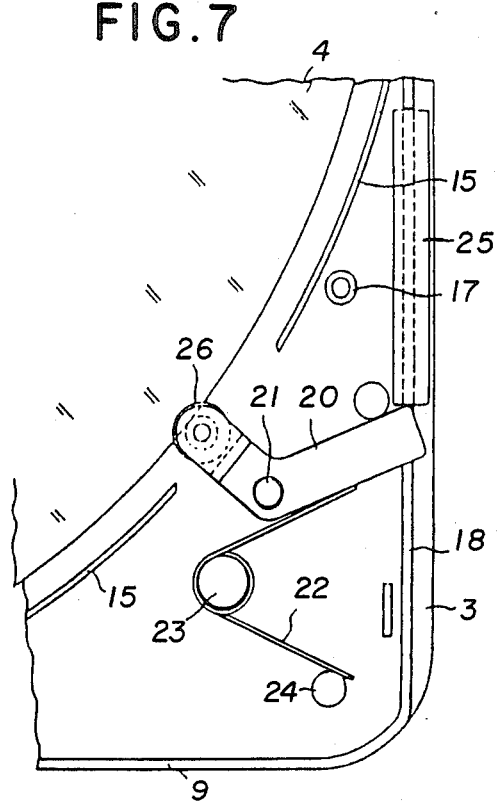
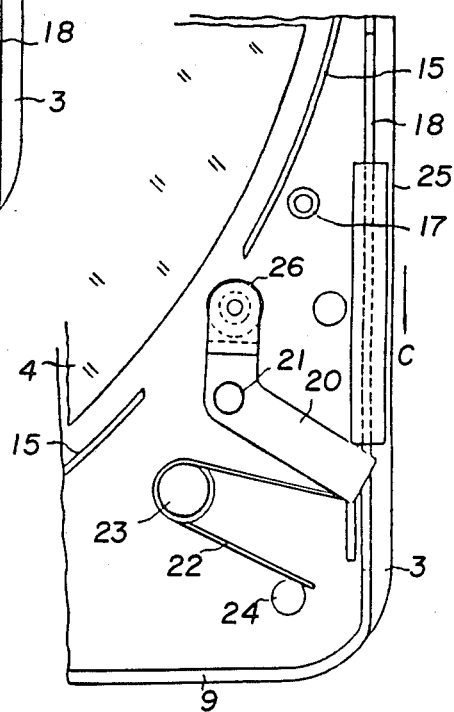

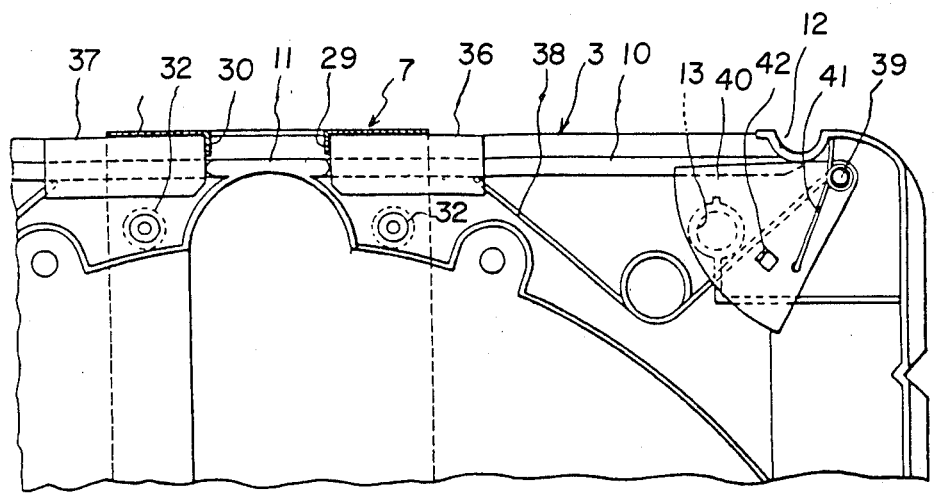
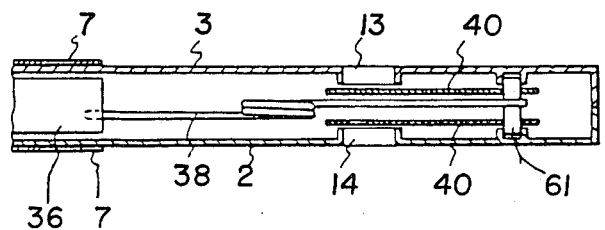
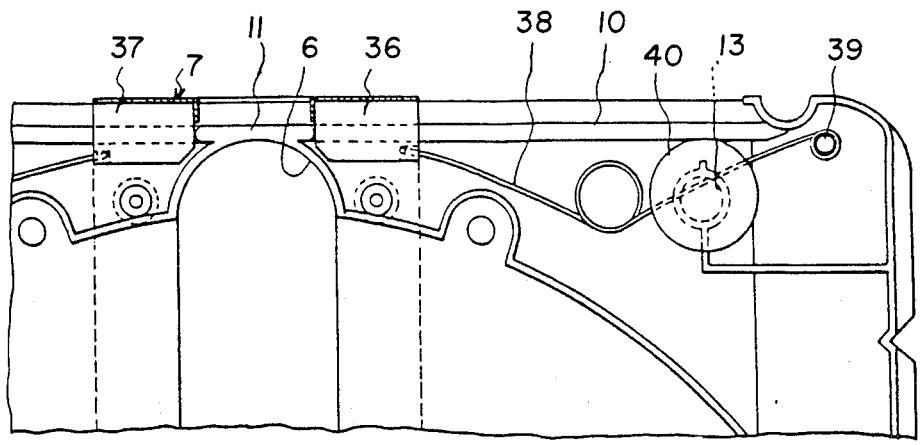

SHUTTER ASSEMBLED DISC CARTRIDGE

This application is a continuation of copending application Ser. No. 642,508, filed on Aug. 20, 1984.

FIELD OF THE INVENTION

The present invention relates to a recording disc cartridge, and more particularly to a recording disc cartridge having shutters for opening and closing spindle holes and head insertion holes defined on both faces of the recording disc cartridge case.

PRIOR ART DISCUSSION

Recording disc cartridges of the type having a recording disc of a magnetic or optical recording medium and a disc case made of a hard material with a generally flat rectangular shape are adapted to be mounted on a disc drive apparatus so that the recording disc is rotated and accessed by a magnetic recording head or an optical recording head for recording or reproducing the information. In order to access the recording disc by the head, the disc case is provided with head insertion holes and spindle holes for allowing the entering of a drive member of the disc drive on both faces of the disc case.

In order to prevent foreign substances or a finger from entering into the disc case, by which the recording disc may be stained, conventionally the disc case is provided with shutter members for closing and opening the respective head insertion holes. FIGS. 1 and 2 show one example of the recording disc cartridge of the above type, wherein reference numeral 1 denotes a disc case made of a top case half 2 and a bottom case half 3. A recording disc 4 is rotatably enclosed in the disc case 1, having a spindle hole 5 defined on the central portion of the disc case 1. A head insertion hole 6 is defined adjacent to the spindle insertion hole 5, with a shutter 7 for opening and closing the head insertion hole 6 having an opening 8 defined on the shutter. The shutter 7 is normally situated at the closed position for closing the head insertion hole 6 and when the recording disc is used the shutter 7 can be moved in a direction A by a shutter moving arrangement in a recording/reproducing apparatus, so that the head insertion hole 6 can be opened when the hole 8 comes in alignment with the head insertion hole 6.

In the conventional recording disc cartridge, the shutters provided on both planes of the disc case are adapted to be moved in one direction, therefore when the recording disc shown in FIG. 1 is reversed and mounted on a recording/reproducing apparatus, the shutter is moved in the direction B which is the reverse of the direction A for opening the head insertion hole 6. Accordingly, the recording/reproducing apparatus must be provided with two shutter opening mechanisms, one for moving the shutter in the direction A and another for the direction B to enable to use the dual type recording disc i.e., both faces of the recording disc are available for recording. Therefore the construction of the recording/reproducing apparatus is complicated.

Furthermore, if the conventional recording disc cartridge is not provided with a shutter arrangement for closing the spindle holes, foreign substances such as dust may enter the inside the disc cartridge. It is greatly required to provide an arrangement for preventing the introduction of dust inside the disc case in particular for optical recording discs having a large memory capacity.

Another problem of the conventional disc cartridge is that if the shutter for the head insertion hole is not completely opened when the disc cartridge is loaded on the recording/reproducing apparatus, the head in the recording/reproducing apparatus may erroneously strike on the shutter, thereby damaging the head.

SUMMARY OF THE INVENTION

An essential object of the present invention is to provide a recording disc cartridge having a shutter arrangement operable in two directions so that the shutter drive mechanism of the recording/reproducing apparatus can be simplified.

A further object of the present invention is to prevent erroneous striking of the head on the shutter so as to prevent damage to the disc cartridge.

According to the present invention, in a disc cartridge comprising a disc case formed by a top half and a bottom half each having a spindle hole and a head insertion hole, a recording medium rotatably enclosed in the disc case and shutter means for closing and opening the spindle holes and the head insertion holes, the improvement comprises a means for guiding the shutter means in a lateral direction of the disc case, a slide means provided so as to move the shutter means in both directions relative to a line passing each center of the spindle hole and the head insertion hole engageable with the shutter means and means for resiliently exerting the slide means to drive the shutter means for closing the spindle holes and the head insertion holes.

BRIEF EXPLANATION OF THE DRAWINGS

FIG. 3 is a front view of a recording disc cartridge according to the present invention, FIG. 4 is a plan view of the recording disc cartridge shown in FIG. 3, FIG. 7 is an enlarged partial plan view showing the relation of an engagement between the recording medium and rollers, FIG. 8 is an enlarged partial plan view showing the relation between the recording medium and the rollers disengaged from the recording medium.

FIG. 16 is a further embodiment of a disc cartridge according to the present invention, FIG. 17 is a cross sectional view showing a further embodiment of a disc cartridge according to the present invention, and FIG. 18 is an enlarged partial plan view showing a further embodiment of a disc cartridge according to the present invention.

DETAILED DESCRIPTION OF THE INVENTION

Figure 1:
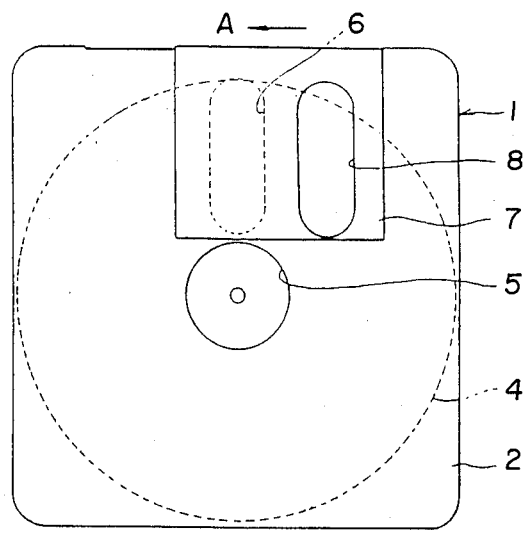
FIG. 1 is a top plan view of an example of a conventional recording disc cartridge.
Figure 2:
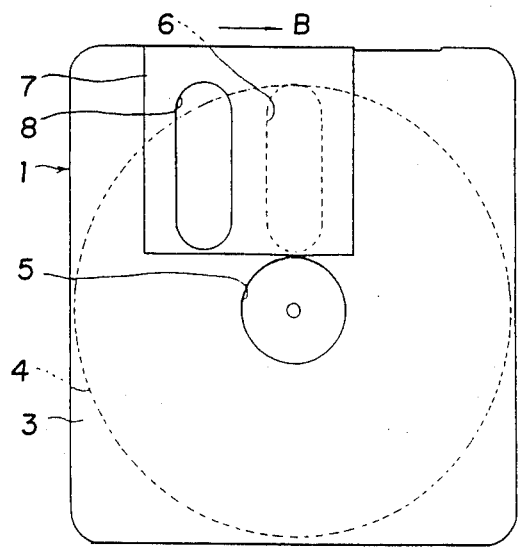
FIG. 2 is a bottom plan view of the recording disc cartridge in FIG. 1.

Before the description proceeds, it is noted that throughout the drawings like parts are designated by like reference numerals.

Referring to FIGS. 3 and 4, the recording disc cartridge according to the present invention is essentially formed by a disc case 1 made of plastic resin material a recording medium 4 in the form of a disc rotatably enclosed in the disc case 1 and a shutter member 7 formed by bending a metal plate in a U character shape.

The disc case 1 is formed by a top half 2 and a bottom half 3. They are assembled together to provide a chamber for accommodation of the recording medium 4 and other necessary components and they are securely connected by screws.

Figure 5:
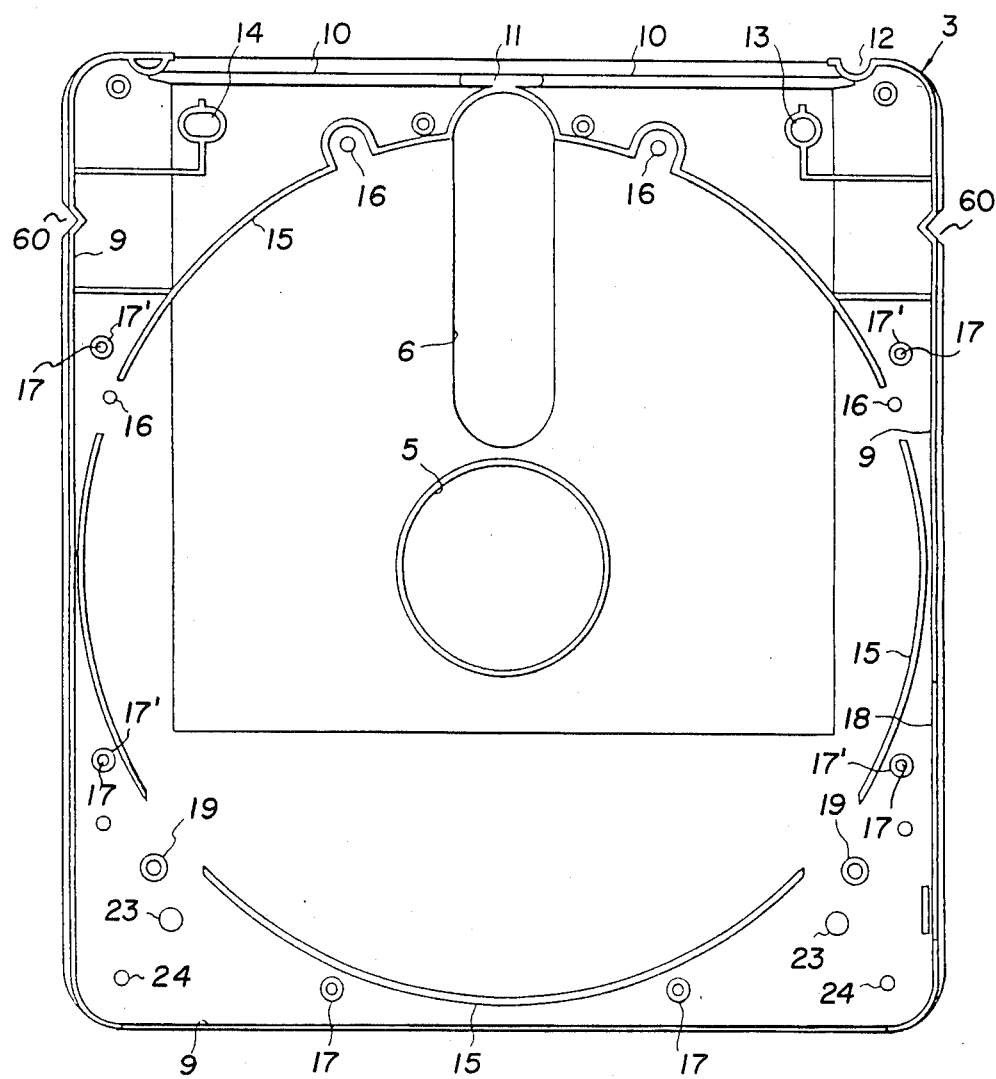
FIG. 5 is a plan view showing the interior of the disc cartridge shown in FIG. 3.
Figure 6:
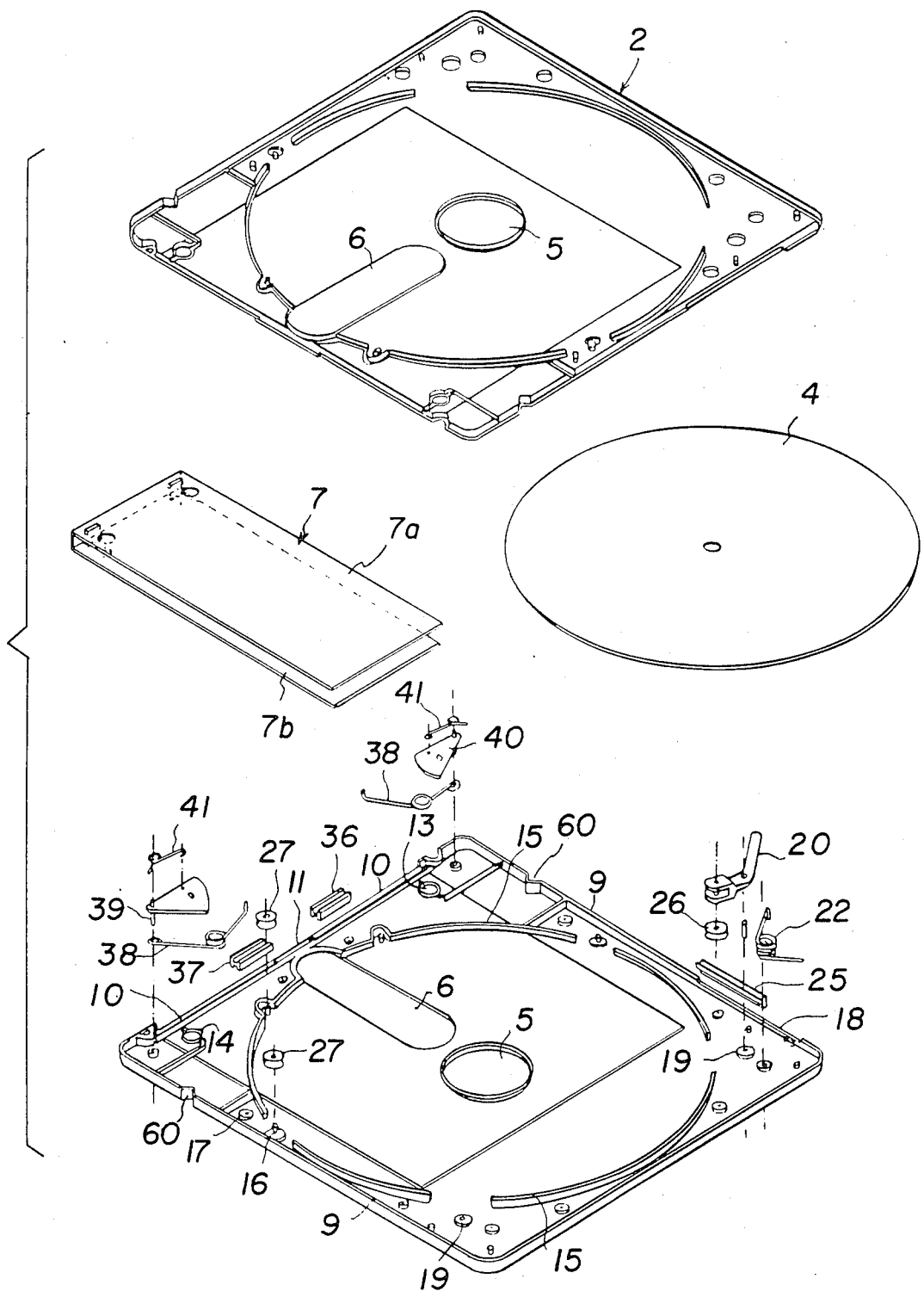
FIG. 6 is a exploded perspective view of the disc cartridge according to the present invention.

Referring to FIG. 5, which shows the inside of the bottom section 3, connecting walls 9 are formed so as to project from the peripheral edge portions of the bottom half 3 except for the front edge and a right bottom portion of the right edge. A spindle hole 5 is defined at the central portion of the bottom half 3 and an elongated head insertion hole 6 is defined so as to extend from near the spindle hole 5 to near the front edge. On the central portion of the front edge of the bottom half, a stopper rib 11 is provided which projects from the edge upward and which extends in a lateral direction with respect to the central portion a length and a height equal to the height of the peripheral wall 9. Also, a pair of guide walls 10 are provided which project from the front edge upward and extend laterally, on both sides of the stopper rib 11 with a height lower than the height of the peripheral wall 9. An identification recess 12, semicircular shape is defined on the front right corner portion of the bottom half 3 for identifying the A face and B face of the recording disc cartridge. A pair of standard pin insertion holes 13 and 14 are provided in the front corner portion of the bottom half 3 with both holes 13 and 14 being symmetrical relative to the head insertion hole 6. A plurality of partition walls 15 project from the bottom section 3 in an annular shape coaxial with the spindle hole 5 so as to conform to an imaginary circle of the periphery of the recording medium 4 but separated in the circumferential direction, so that the recording medium 4 can be accommodated in a space surrounded by the partition walls 15. Two shafts 16 project from the bottom half 3 in spaces between separated portion of the partition walls 15 for rotatably supporting rollers (not shown) for facilitating rotation of the recording medium. A plurality of through holes are defined bosses 17 which project from the bottom half 3 outside the partition walls 15 for receiving screws for connecting the top half 2 and the bottom half 3. A guide recess 18 is formed along the peripheral wall 9 existing at the rear right half portion of the bottom half 3. Supporting shaft insertion holes 19 and a plurality of pins which will be described later are formed at positions as shown in the drawings. The supporting shaft insertion holes 19 and the pins 23 existing on the right half and left half are respectively placed at symmetrical positions relative to the center of the bottom half 3.

The top half 2 has the same configuration of the bottom half 3, as described above except that the guide recess 18 is formed on the top half symmetrical with the guide recess 18 of the bottom half 3. By this configuration, both the top and bottom halves 2 and 3 can be made using the same mold, employing changeable cores for molding the guide recess 18 and the identification recess 12. Specifically, when molding the bottom half, the changeable core for the guide recess 18 and the core for the identification recess 12 are assembled at predetermined positions in the right half portion of the mold, for example, so that the bottom half as shown in FIG. 5 can be molded. To the contrary, by placing the cores at the predetermined positions in the left half portion of the same mold as used in making the bottom half, the top half 2 can be molded. As mentioned above, according to this embodiment, the same mold can be used for making either the top half 2 or bottom half 3, thus the cost of the mold for making the disc cartridge can be decreased.

The recording medium 4 is an optical recording disc having recorded information and accommodated in the space surrounded by the partition walls 15 so as to rotate only when the recording disc cartridge is in use.

As shown in FIGS. 7 and 8, a rotational lever 20 bent at the intermediate portion is pivoted around a pin 21 inserted in the supporting pin insertion hole 19 adjacent to the guide recess 18. The rotational lever 20 is rotated in a counter clockwise direction by a spring member 22 which is engaged in the supporting pin 23 disposed adjacent to the supporting pin insertion hole 19 with one end portion of a spring member 22 engaged with the pin 24 of a small diameter and another end engaged with the rotational lever 20. One end portion of the rotational lever 20 is engaged with a lower end portion of a slide 25 which is slidably fitted in the other guide recess 18 and the end is provided with a guide roller 26 which can be engaged with the peripheral edge of the recording medium 4. Other rollers 27 are also rotatably supported on the roller support pins 16 disposed at positions diagonally across from the roller 26 so that the rollers 27 can be rotatingly engaged with the peripheral edge of the recording medium 4. By this arrangement, the recording medium 4 is supported at three points by the roller 26 resiliently biassed by the spring member 26 and the rollers 27 when the recording disc cartridge is not in use, so that the recording medium 4 is prevented from rotation. To the contrary, when the recording disc is in use, the slide 25 is moved in the direction C by a moving member in the recording/reproducing apparatus, and the rotational lever 20 is rotated clockwise against the force of the spring member 22. Therefore, the roller 26 provided on the rotational lever 20 leaves the recording medium 4, so that the recording medium 4 can be freely rotated.

The shutter 7 is formed by bending a metal plate such as stainless steel in generally a U character shape so as to provide two opposing plates 7a and 7b acting as shutter plates. A through hole 28 in a rectangular shape is defined on the front plate 7c. When making this through hole 28, parts of the metal plate 7c are bent inwardly so as to form a first engaging member 29 and a second engaging member 30. Both plates 7a and 7b have a size suitable for closing the spindle hole 5 and head insertion hole 6 and portions of both plates 7a and 7b have through holes 32 and engaging chips 31.

Figure 9:
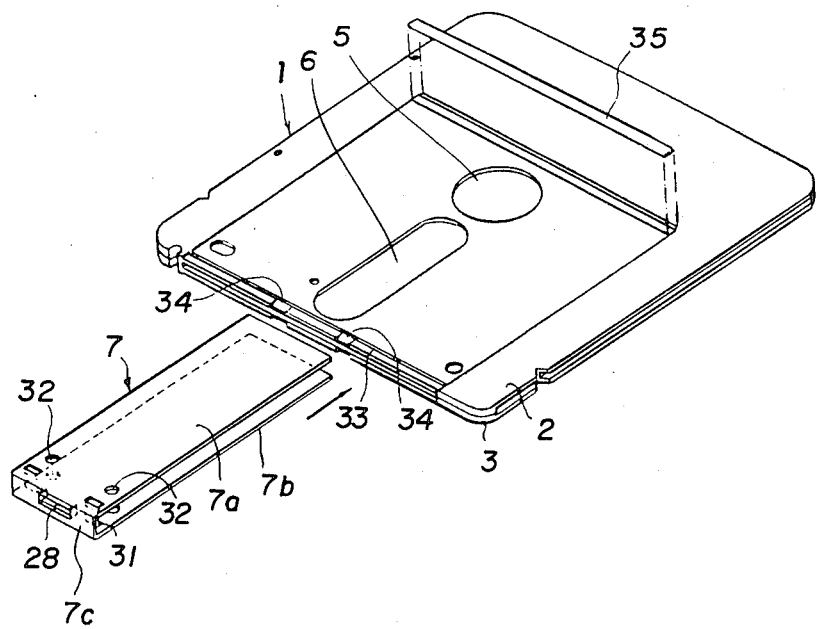
FIG. 9 is a perspective view showing an example of assembling of the shutter in the disc case.
Figure 10:
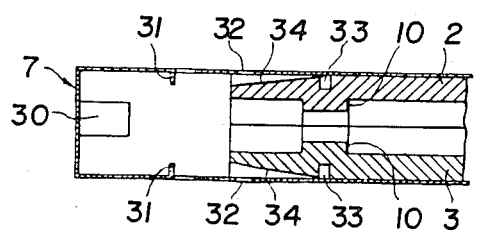
FIG. 10 is a cross sectional view of FIG. 9.

As shown in FIGS. 9 and 10, guide slots 33 are defined on both surfaces of the top half 2 and the bottom half 3 in the front portion thereof so as to extend in parallel with the guide walls 10. The front portions of the outer surfaces of the top and bottom halves 2 and 3 are tapered as shown by 34 (FIG. 10), from the guide slots 33 lower toward the front end of the disc case 1. The shutter 7 is assembled on the disc case 1 by fitting the disc case 1 in the space between the plates 7a and 7b from the front, sliding the chips 31 on the tapered portion 34, thereby causing the chips 31 to be movably mated in the corresponding guide slot 33. Then the shutter 7 can be moved laterally (right or left) so that the shutter closes and opens the spindle hole 5 and the head insertion hole 6 by moving the shutter 7.

After the shutter 7 is assembled to the disc case 1, fastening plates 35 are fitted on each of the outer surfaces of the disc case 1 so as to cover the free end portions of the shutter plates 7a and 7b for preventing the free end portions of the shutter plates 7a and 7b from deviating away from the surface of the disc case 1.

Figure 11:
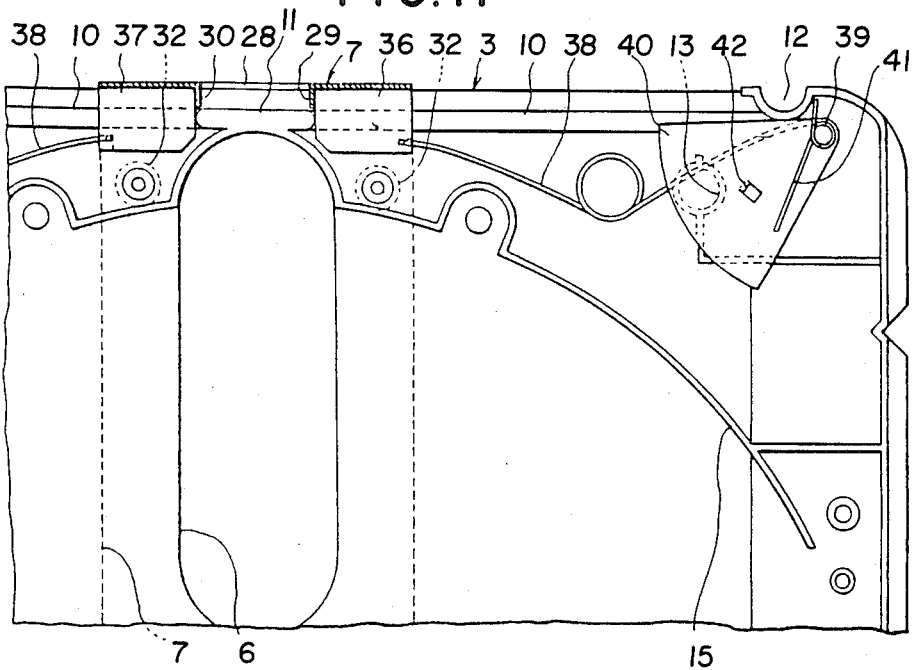
FIG. 11 is an enlarged partial plan view with the shutter closed.

FIG. 11 shows the interior of the disc case to which the shutter 7 is already assembled. The first slide 36 and the second slide 37 are slidably fitted on the guide walls 10, respectively. Both slides 36 and 37 are formed by of a good slidable material, for example, a fluorine containing resin. The first slide 36 is adapted to move laterally along the guide wall 10 at the right of the stopper 11 and the second slide 37 is adapted to move laterally along the guide wall 10 at the left of the stopper 11. The surfaces of the slides 36 and 37 opposing each other are adapted to engage with the first engaging member 29 and the second engaging member 30, respectively. Furthermore, both slides 36 and 37 are by resilient members 38 so as to contact the first engaging member 29 and the second engaging member 30. Both medial ends of the resilient members 38 are adapted to engage the respective slides 36 and 37 and the lateral ends are respectively engaged with both support shafts 39 provided on the bottom half 3.

Fan shaped shutters 40 are rotatably supported on the respective support shafts 39 so as to open and close the standard pin insertion holes 13 and 14. The fan shaped shutters 40 are forced by springs 41 engaged by the support shafts in a direction to close the standard pin insertion holes 13 and 14. An engaging raised projection 42 is formed on the central portion of each of the fan shaped shutters 40 for detachably engaging with the intermediate portion of one of the legs of the spring member 38.

When the disc cartridge is not in use, the shutter 7 is situated in a position for closing the spindle hole 5 and head insertion hole 6, since the slide 36 (or 37) is returned in to a home position in engagement with the stopper 11 by the spring member 38, as shown in FIG. 11.

Figure 12:
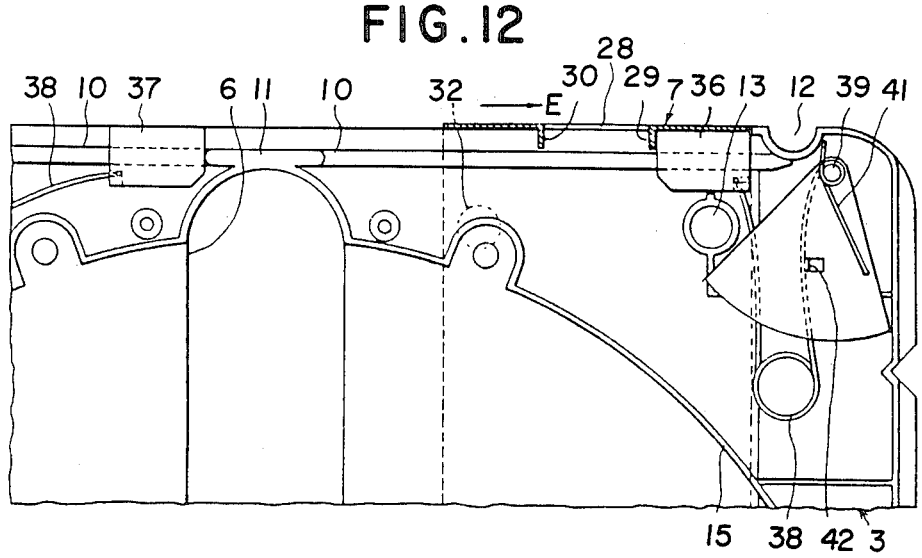
FIG. 12 is an enlarged partial plan view with the shutter opened.

Under a state, the fan shaped shutter 40 closes or shuts the standard pin insertion hole 13 by the force of the spring 41. Although only the right half portion of the disc cartridge is shown in FIGS. 11 and 12, the same operation as described above is applicable to the left half portion of the disc cartridge (not shown).

Figure 13:
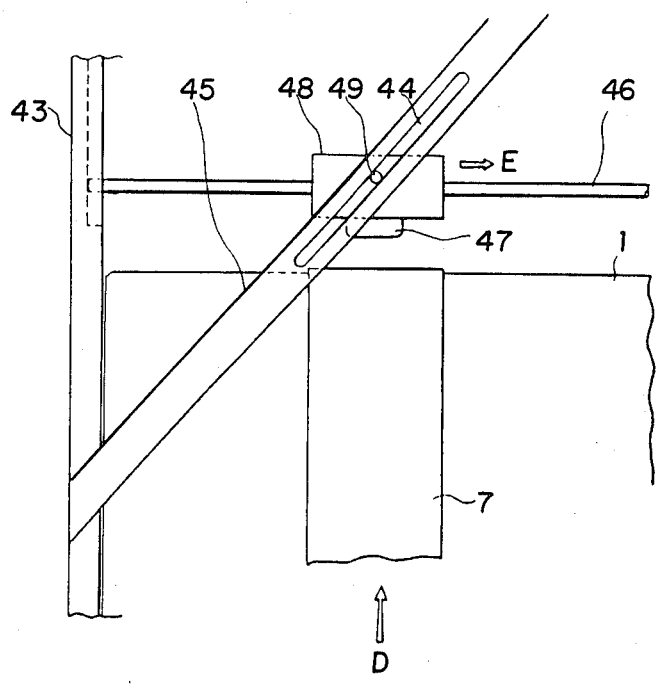
FIG. 13 is a plan view showing an essential portion of the shutter driving mechanism.

FIG. 13 shows a shutter drive mechanism on the recording/reproducing apparatus, wherein a cam plate 45 is slantingly provided on a part of a frame 43 of the recording/reproducing apparatus so as to extend in a direction of insertion of the disc cartridge. An elongated guide slot 44 is defined in the cam plate 45. A guide bar 46 is mounted on the frame 43 so as to be moved along the frame 43, and a chip 48 having a projection 47 is slidably mounted on the guide bar 46 for movement along the guide bar 46.

A pin 49 projecting from the movable chip 48 is adapted to be slidably engaged in the elongated guide slot 44.

In attempting to use the A face of the recording disc cartridge, upon mounting of the recording disc cartridge on the recording/reproducing apparatus in the direction D, the projection 47 of the movable chip 48 can be mated in the hole 28 of the shutter 7.

By a further movement in the direction D, the guide bar 46 is moved in the direction D, causing the pin 49 to slide in the guide slot 44, so that the movable chip 48 is moved along the guide bar 46 in the direction E perpendicular to the direction D. By the movement of the movable chip 48 in the directon E, as shown in FIG. 12, the shutter 7 is moved in the same direction E by engagement with the projection 47 of the movable chip 48, the first slide 36 is pushed by the first engaging member 29 moving in the direction E along the guide rib 10, thereby causing the spindle hole 5 and the head insertion hole 6 to be opened. Upon movement of the first slide 36 in the direction E, the spring member 38 engaged between the first slide 36 and the support pin 39 is resiliently deformed by the force of the first slide 36, causing the fan shaped shutter 40 to rotate in the a counter clockwise direction, so that the standard pin insertion hole 18 is opened. When the standard pin insertion hole 13 is completely opened, it is recognized that mounting of the disc cartridge is finished upon engagement of the V shaped recess 60 with a roller provided in the recording/reproducing apparatus. Subsequently, the disc cartridge is lowered to the load position by a loading mechanism in the recording/reproducing apparatus, whereby a standard pin (not shown) enters through hole 32 and the standard pin insertion hole 14, so that the disc cartridge can be positioned in the standard position and the recording head (not shown) can be inserted in the head insertion hole 6. Thus, the disc cartridge is ready for recording or reproducing.

As the movement of the fan shaped shutter 40 for opening the standard pin insertion hole 13 is linked with the movement of the shutter 7 for opening the spindle hole 5 and the head insertion hole 6, so long as a part of the fan shaped shutter 40 is situated facing the standard pin insertion hole 13, the shutter 7 is also not completely open. Under such a state, if the disc cartridge is lowered toward the standard position, the standard pin is blocked by the fan shaped shutter 40 and the shutter 7, and the disc cartridge can not be set in the standard position, whereby undesirable contact of the recording head with the shutter 7 can be prevented. Furthermore, if the movable chip 49 is disengaged from the shutter 7, since the spring member 38 is already moved to the foremost right end portion and the standard pin has been introduced into the standard pin insertion hole 3, the shutter 7 and the fan shaped shutter 40 are respectively prevented from returning to the home position by engagement of the spring member 38 with the standard pin, thereby avoiding a collision of the shutter 7 with the recording head. In this embodiment, the standard pin is adapted to pass the through hole 32 defined in the shutter 7 therefore, the standard pin enters the through hole 32 during the loading operation of the disc cartridge, and the shutter 7 is also prevented from returning to the home position, so that a double safety mechanism is provided.

In a case where a standard pin provided on the recording/reproducing apparatus enters in the standard pin insertion hole 13, the recording disc cartridge is loaded in the standard position.

Through this operation, the spring member 38 is moved up to the right side position of the standard pin, and the shutter 7 and the fan shaped shutter 40 are prevented from returning to their home position by the engagement of the standarad pin with the spring member 38. Thus the shutter 7 and the fan shaped shutter 40 are prevented from returning to the home position during the loading operation.

When using the B face of the recording disc cartridge, the recording disc cartridge is turned over and loaded in the manner as described above. By turning over the recording disc cartridge, the geometric relation is reversed from the state shown in FIG. 11 in terms of the lateral direction or right and left side of the cartridge. In this case, when the shutter is moved in the direction E in FIG. 13, the second slide 37 is moved by the force of the second engaging member 30 of the shutter 7 so as to open the spindle hole 5 and the head insertion hole 6. The operations of the second spring member 38 and the fan shaped shutter are similar to those shown in FIG. 12 as the A face of the disc cartridge is used.

As described above, in using either the A face or B face of the recording disc cartridge, the movement of the shutter drive mechanism of the recording/reproducing apparatus may be in one direction, so that the shutter drive mechanism can be simplified.

Figure 14:
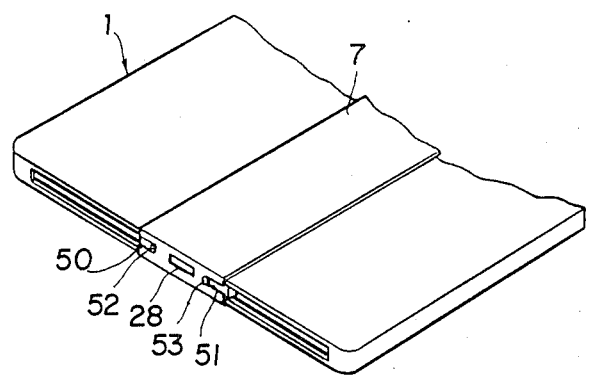
FIG. 14 is a partial perspective view showing a further embodiment of the disc cartridge according to the present invention.
Figure 15:
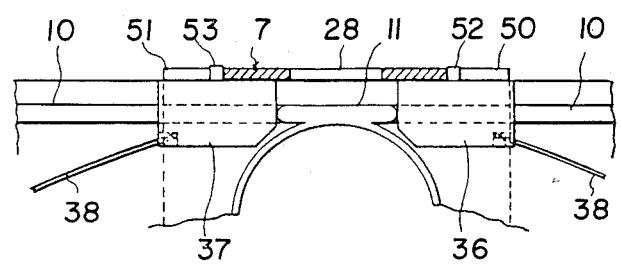
FIG. 15 is an enlarged partial plan view showing an essential portion of the disc cartridge shown in FIG. 14.

FIGS. 14 and 15 show another embodiment of the engaging mechanism of the shutter 7 and the slides 36 and 37. In this embodiment, the shutter 7 is provided with an insertion hole 28 in the central portion of the front face of the shutter with first and second U shaped engagement recesses 50 and 51 defined on the lateral edges of the front portions of the shutter 7. A pair of pins 52 and 53 project from the first slide 36 and second slider 37, respectively, in the front direction of the disc case 1 so as to be engaged in the engaging recesses 50 and 51. By this arrangement, when the shutter 7 is moved in the right direction in FIG. 15, the pin 52 of the first slide 36 is pushed by the shutter 7, and is moved along the guide wall 10. When the shutter 7 is moved to the left, the second slide 37 is moved left along the guide wall 10. Thus, the fan shaped shutter 40 can be operated in the same manner as described above.

As apparent from the foregoing, since the shutter 7 can be moved in both the right and left directions relative to the phantom line passing each center of the spindle hole 5 and head insertion hole 6, the shutter drive mechanism provided in the recording/reproducing apparatus is only be constructed as to move in one direction for operating the shutters in the recording disc cartridge mounted on the recording/reproducing apparatus for using either the A face or B face.

Referring to FIG. 16 showing another embodiment of the present invention, each of the slides 36 and 37 is extended in the sliding direction, having a length longer than the length of the slides shown in the embodiment described above, so that the spring member 38 is resiliently bent when the shutter 7 is at the closed position. By this arrangement, the spring member 38 can be concealed from the standard pin insertion hole 13 when the disc cartridge is not in use. The spring member 38 can be concealed by extending the length of the stopper 11.

Referring to FIG. 17, two fan shaped shutters 40 are rotatably supported on a supporting shaft 61 with the spring member 38 disposed in a space between the fan shaped shutters 40. The shutters 40 close the respective standard pin insertion holes 13 provided in the top half 2 and the bottom half 3 by spring members (not shown) when the disc cartridge is not in use. When the shutter 7 is opened, the fan shaped shutters 40 are rotated for opening the standard pin insertion holes 13 by movement of the spring member 38 upon opening in the same manner as described above. By closing the pin insertion holes 13, dust or like foreign substances can be prevented from entering inside the disc case.

Referring to FIG. 18, the fan shaped shutter 40 is securely fixed to an intermediate portion of the spring member 38 so that the fan shaped shutter 40 can be moved integral with the spring member 38, thereby making it possible to omit the spring member for returning the fan shaped shutter 40 to the home position. In this embodiment, the shutter 40 has an annular shape.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A disc cartridge comprising a disc case formed by a top half and a bottom half each having a spindle hole and a head insertion hole defined in a central portion thereof, said disc case having a front face, a rear face, left and right side faces, an upper face and a lower face; a recording medium rotatably enclosed in said disc case; a single shutter means having a predetermined size for closing each of said head insertion holes, said shutter means being mounted on said disc case in a closed position for closing said head insertion holes when said disc cartridge is not in use and being movable laterally towards either side of said disc case to an open position for opening said head insertion hole; and a pair of biasing means for resiliently forcing said shutter means to said closed position, said biasing means being positioned to the left and right of said head insertion hole in said front face of said disc case.

2. The disc cartridge according to claim 1, wherein said biasing means comprise spring members.

3. The disc cartridge according to claim 2, wherein said biasing means further includes a slide member pressured by said spring member for pressuring said shutter means towards said closed position.

4. The disc cartridge according to claim 1, wherein said shutter means comprises a plate like member formed in a generally U-character shape in cross section, mounted on said disc case so as to move along one face of said disc case.

5. The disc cartridge according to claim 1, which further comprises stopper means for preventing each of said biasing means from biasing said shutter means to enter into the shutter moving area of the other biasing means past said closed position.

6. The disc cartridge according to claim 1, wherein said shutter means has a size sufficient for covering both said spindle holes and head insertion holes.

7. The disc cartridge according to claim 1, wherein said single shutter means is movable in a lateral direction perpendicular to a center line on which said head insertion holes and said spindle holes are aligned.

8. A disc cartridge comprising a disc case formed by a top half and a bottom half each having a spindle hole and a head insertion hole defined in a central portion thereof, said disc case having a front face, a rear face, left and right side faces, an upper face and a lower face, a recording medium rotatably enclosed in said disc case, a shutter means having a predetermined size for closing each of said head insertion holes, said shutter means being mounted on said disc case in a manner so that said shutter means can be moved laterally towards either side of said disc case along said front face to positions for opening said head insertion holes, a pair of biasing means provided at said front face of said disc case situated lateral to shutter means moving areas for biasing said shutter means to a closed position for closing said head insertion holes when said disc cartridge is not in use, said biasing means including a pair of slidable members mounted on said front face of said disc case and a pair of spring members, each of said slidable members being disposed between a free end of each of said spring members and said shutter means so that said respective free end of said spring members pushes said shutter means toward the closed position via said respective slidable member.

9. The disc cartridge according to claim 8, wherein said shutter means comprises a plate member formed in a generally U-character shape in cross section, mounted on said disc case so as to move along one edge of said disc case.

10. The disc cartridge according to claim 8, wherein said disc cartridge further comprises stopper means for preventing each of said biasing means from forcing said shutter means beyond the closed position.

11. The disc cartridge according to claim 8, wherein said shutter means has a size sufficient for covering both of said spindle hole and head insertion hole.

12. The disc cartridge according to claim 8, wherein said shutter means is movable in a direction perpendicular to a center line on which said head insertion holes and said spindle holes are aligned.

13. The disc cartridge according to claim 12, wherein said shutter means comprises a U-shape providing a pair of opposing shutter plates joined by a connecting plate with an opening for engagement of an engaging member provided in a recording reproducing apparatus for moving said shutter means, said opening being defined at the central portion of said connecting plate.

14. The disc cartridge according to claim 8, wherein engagement of said slide members and shutter means is effected by engaging members formed by bending parts of said shutter means.

15. The disc cartridge according to claim 8, wherein each of said slidable members is provided with a projection which is engageable with a front surface of said shutter means.

16. The disc cartridge according to claim 8, wherein said shutter means is provided with a least one standard pin insertion hole corresonding to at least one standard pin insertion hole of said disc case.

17. A disc cartridge comprising a disc case formed by a top half and a bottom half each having a head insertion hole defined in a central portion thereof and standard pin insertion holes, a recording medium rotatably enclosed in said disc case, a first shutter means having a generally U-character shape forming a top plate, a bottom plate and a front plate for closing and opening said head insertion holes and spring members for biasing said first shutter means to a closed position, and second shutter means for closing and opening each of said standard pin insertion holes, said second shutter means being opened by movement of said spring members for biasing said first shutter means.

18. The disc cartridge according to claim 17, wherein said second shutter means are provided with an engaging member for engagement with said spring members.

19. The disc cartridge according to claim 17, wherein said second shutter means are secured to said spring members.

20. The disc cartridge according to claim 17, wherein said second shutter means are provided with a standard pin insertion hole corresponding to a standard pin insertion hole of said disc case at said top plate of said first shutter means.

21. A disc cartridge comprising a disc case formed by a top half and a bottom half each having a spindle hole and a head insertion hole, said disc case having front, rear, left and right faces, a recording medium rotatably enclosed in said disc case, shutter means for closing and opening said spindle holes and the head insertion holes, said shutter means being formed in a generally U-character shape to form a pair of opposing flat plates connected by a connecting plate at one edge of each of the opposing flat plates, said connecting plate having an opening defined therein, said shutter means being moved into its position to close said spindle holes and head insertion holes by a biasing means including a spring means which resiliently pressure first and second slide members along guide means for guiding said shutter means along said front face of said disc case either to the left or the right of said head insertion hole of said disc case which direction is perpendicular to an axis passing through the centers of said spindle holes parallel to said left and right faces of said disc case.

22. A disc cartridge comprising a disc case formed by a top half and a bottom half each having a spindle hole and a head insertion hole, said disc case having front, rear, left and right faces, a recording medium rotatably enclosed in said disc case, a shutter means for closing said spindle holes and said head insertion holes at a center portion of said case and for opening said spindle holes and said head insertion holes at first and second opening positions of said case, guide means at said front face for guiding said shutter means to the left or right of said head insertion hole of said disc case which direction is perpendicular to a center line commonly passing each center of said spindle holes parallel to said left and right faces of said disc case, first and second slide members provided so as to be movable in respective lateral half areas of said case in said left and right directions relative to said center line in such a manner that one of said first and second slide members engages said shutter means while the other one of said first and second slide members is disengaged from said shutter means when the shutter means is moved between the center position and one of said first and second opening positions; and means for resiliently pressuring said first and second slide members to cause said shutter means to move to its closed position.

23. The disc cartridge according to claim 22, wherein said disc cartridge further comprises a stopper means for stopping said first and second slide members disposed on said center line.

24. The disc cartridge according to claim 22, wherein said shutter means comprises a U-shape providing a pair of opposing shutter plates joined by a front plate and the engagement of the slide members and the shutter means is realized by engaging members formed by bending parts of said front plate of said shutter means.

25. The disc cartridge according to claim 24, wherein said slide members are provided with projections for engaging with bent parts of said front plate of the shutter means.

26. The disc cartridge according to claim 22, wherein said shutter means is made of a generally U-shaped plate member having two flat plates and a front plate connecting said flat plates, said front plate having an opening for engagement of an engaging member provided in a recording/reproducing apparatus for moving said shutter means.

27. The disc cartridge according to claim 22, wherein said shutter means is provided with at least one opening corresponding to a standard pin insertion hole of said disc case.

* * * * *